(12) United States Patent (10) Patent No.: US 8,285,840 B2
Dobroth et al. (45) Date of Patent: Oct. 9, 2012

(54) USING SOCIAL NETWORKING TO HELP USERS PURCHASE MOBILE APPLICATIONS AND DEVICES

(75) Inventors: Kathryn Mary Dobroth, Jamica Plain, MA (US); Hannah Youngsil Moon, Boston, MA (US); Dorothy Beau Morley, Wakefield, MA (US)

(73) Assignee: Cellco Partnership, Basking Ridge, NJ (US)

( * ) Notice: Subject to any disclaimer, the term of this patent is extended or adjusted under 35 U.S.C. 154(b) by 228 days.

(21) Appl. No.: 12/724,083

(22) Filed: Mar. 15, 2010

(65) Prior Publication Data

US 2011/0225291 A1 Sep. 15, 2011

(51) Int. Cl.
*G06F 15/173* (2006.01)
(52) U.S. Cl. ........................................................ 709/224
(58) Field of Classification Search .................. 709/224
See application file for complete search history.

(56) References Cited

U.S. PATENT DOCUMENTS

| | | | |
|---|---|---|---|
| 2007/0118661 A1 | 5/2007 | Vishwanathan et al. | |
| 2007/0173236 A1 | 7/2007 | Vishwanathan et al. | |
| 2008/0051071 A1 | 2/2008 | Vishwanathan et al. | |
| 2008/0167015 A1 | 7/2008 | Vishwanathan et al. | |
| 2009/0112701 A1* | 4/2009 | Turpin et al. | 705/10 |
| 2009/0143052 A1* | 6/2009 | Bates et al. | 455/414.2 |
| 2009/0144211 A1* | 6/2009 | O'Sullivan et al. | 706/14 |
| 2009/0240564 A1* | 9/2009 | Boerries et al. | 705/10 |
| 2010/0122283 A1* | 5/2010 | Button | 725/32 |
| 2010/0161720 A1* | 6/2010 | Colligan et al. | 709/203 |
| 2010/0211431 A1* | 8/2010 | Lutnick et al. | 705/10 |
| 2010/0223131 A1* | 9/2010 | Scott et al. | 705/14.53 |
| 2010/0299338 A1* | 11/2010 | Aarni et al. | 707/759 |
| 2010/0306099 A1* | 12/2010 | Hirson et al. | 705/38 |
| 2010/0323667 A1* | 12/2010 | Oschwald et al. | 455/412.2 |
| 2010/0332305 A1* | 12/2010 | Higgins et al. | 705/14.16 |
| 2010/0333019 A1* | 12/2010 | Oschwald et al. | 715/810 |
| 2011/0093336 A1* | 4/2011 | Calabria | 705/14.53 |
| 2011/0154208 A1* | 6/2011 | Horii | 715/736 |
| 2011/0202406 A1* | 8/2011 | Suomela | 705/14.52 |
| 2011/0225291 A1* | 9/2011 | Dobroth et al. | 709/224 |

OTHER PUBLICATIONS

Webpage entitled "Social Networking Software for Viral Marketing from envIO networks," <http://www.envionetworks.com/solutions.html>, © 2009 envIO Networks, accessed around October of 2009.
Webpage entitled "Chorus," <http://www.chorusapps.com/>, © 2009 envIO Networks, accessed around October of 2009.

* cited by examiner

*Primary Examiner* — Jerry Dennison

(57) ABSTRACT

A social network helps mobile device users purchase applications for their devices and to purchase new mobile devices. The network utilizes information from a user's friends to effectively "recommend" applications and mobile devices, and in particular recommend mobile devices based on the applications recommended. The phone numbers of a user's contact list may be scanned by the system to identify friends of the user. A friend network database stores the user's information and friends' information throughout the network and supplies the information to an application store where users may download applications or purchase mobile devices. The information supplied by the database includes the applications and the mobile devices of friends or friends of friends. In response to a user inquiry, the store displays the amount and/or identities of friends and/or friends of friends who have downloaded a particular application or own a particular device.

20 Claims, 6 Drawing Sheets

USING SOCIAL NETWORKING TO HELP USERS PURCHASE MOBILE APPLICATIONS AND DEVICES

TECHNICAL FIELD

The present subject matter relates to techniques and equipment to develop a social network to help mobile device users purchase new mobile devices as well as applications for their devices.

BACKGROUND

In recent years, applications for mobile devices have become a key part of a user's experience with their phone. Because many mobile applications will only run on a subset of mobile devices, the availability of applications is therefore a key consideration, in addition to other considerations such as form factor, cameras, and GPS capability, when choosing a device to purchase. In any purchase, a recommendation from a friend is a particularly strong way to influence a purchase decision. While users may discuss particular phones or applications with friends, it is difficult to ascertain quickly a user's group of friends and the applications and devices the friends have downloaded or purchased. Social networking sites also allow people to identify and communicate with their friends. For example, social networking sites allow a user to contact friends, post messages on their user page, send messages to friends, and interact with their friends via the social networking site. The social networking sites typically do not allow the user to purchase products or services, but may allow advertisements. These sites also do not include information related to a friend's mobile device or applications downloaded to their mobile device or recommendations for downloading applications or purchasing mobile devices.

Hence a need exists for a social network, which provides a user with information related to downloaded applications and mobile devices of friends, which information may help provide a user or potential customer with recommendations as to which applications to download and/or mobile devices to purchase.

SUMMARY

The teachings herein alleviate one or more of the above noted problems by providing a social networking method of offering "recommendations" to a user of a mobile device based on activities of identified friends, such as purchases of mobile devices or applications.

Such a method may include the step of obtaining mobile numbers from a contact list of the user stored in the mobile device of the user. In addition, the method includes identifying the mobile numbers from the user's contact list as those of friends of the user in a friend network database. In one example, the method also includes identifying mobile numbers of friends of the identified friends as those of friends of friends of the user in the friend network database. The method also identifies a type of mobile device associated with each respective identified mobile number in the friend network database. The method records in the database in association with the respective identified mobile numbers, an identification of software applications downloaded to mobile devices of friends, and in some examples friends of friends, of the user. Based on the friend network data and in response to at least one inquiry by the user, the method includes the step of transmitting information regarding friends, and in some examples friends of friends, having a particular type of mobile device and information regarding friends, and in some examples friends of friends, who have downloaded a particular software application through a network to a terminal of the user.

In one example, the information transmitted to a terminal of the user comprises the number of friends, and in some examples the number of friends of friends, having a particular type of mobile device or who have downloaded a particular software application. In another example, the information transmitted to a terminal of the user comprises the identities of friends, and in some examples the identities of friends of friends, having a particular type of mobile device or who have downloaded a particular software application. In further examples, the step of obtaining may occur automatically at predetermined intervals or manually by the user.

As a result of the disclosed method, a user can learn about the applications downloaded by friends and devices currently used by friends, which offers a recommendation to the user in a downloading or purchasing decision. Users can also learn about which applications are available on each device. The information is valuable to users considering upgrades because information about friends' devices and applications and which applications are compatible with certain devices is helpful to a user and may persuade them to purchase a particular device and/or application. In addition, the information is valuable to users who are not considering upgrading their devices, but may reconsider when they obtain the information about friends devices and applications and learn that their current device is not compatible with applications that their friends have downloaded. The social network may also provide information of applications and devices of friends of friends which provides additional information for the users to consider.

The methods as outlined above may be implemented as various combinations of hardware and software for implementing the social network for recommending mobile devices and applications. System hardware may comprise special purpose hardware or one or more general purpose server devices programmed to implement the social network related functions. There may also be some programming of mobile devices to support the social network methodologies. A software product includes at least one machine-readable medium and information carried by the medium. The information carried by the medium may be executable program code for causing a programmable device to implement the information flow social network related functions.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
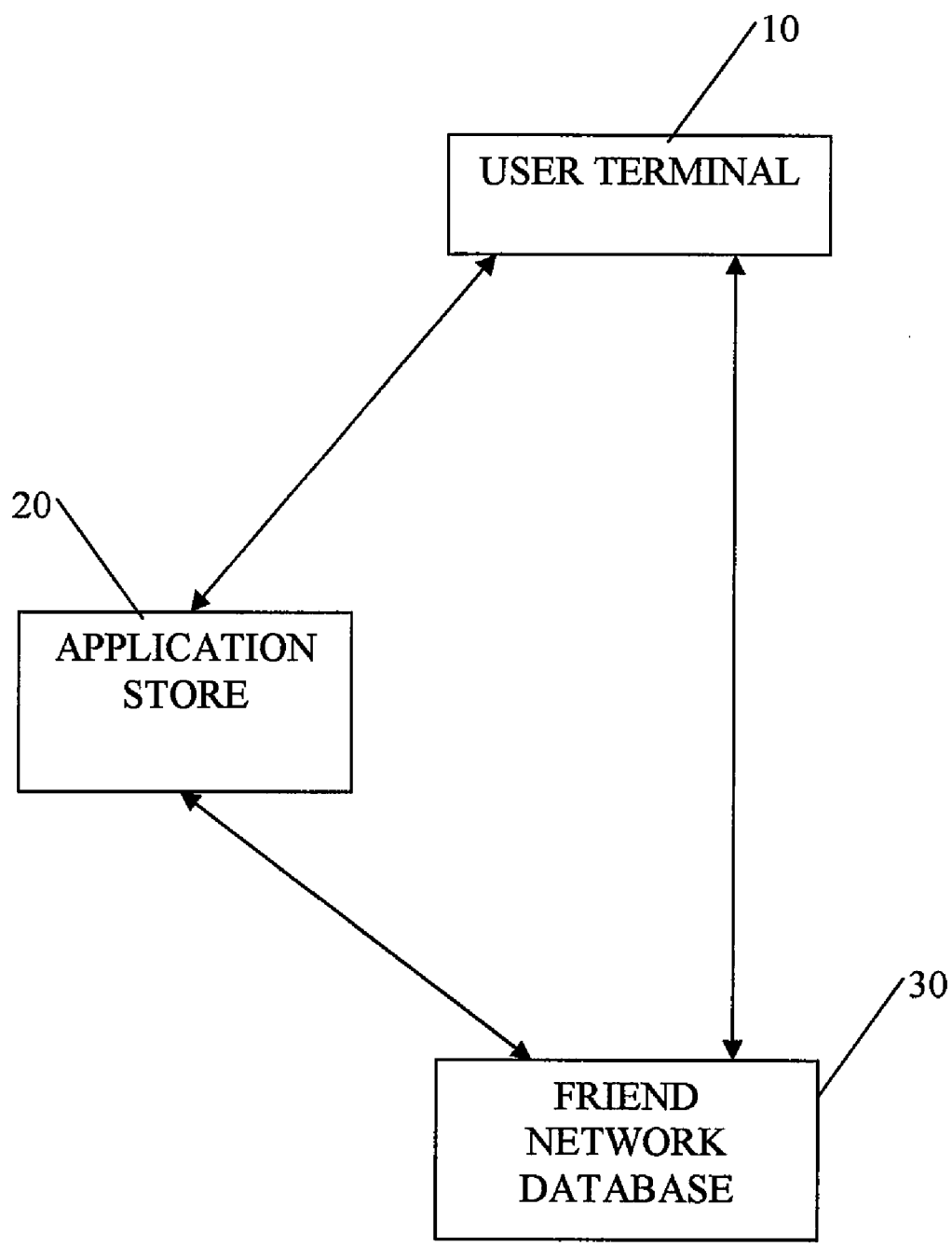
FIG. 1 is a high level block diagram of an exemplary system for implementing a social network method, for example, for providing recommendations regarding mobile devices and/or applications for downloading to such devices.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The disclosure relates to establishing a social network of wireless users so that users can learn about applications and devices from their friends. The network utilizes information from a user's friends to effectively "recommend" applications and mobile devices, and in particular recommend mobile devices based on the applications recommended. In one example, the phone numbers of a user's contact list are obtained by the system to identify users. The contact list may be automatically obtained by the network, manually uploaded by a user, or by any other suitable process for obtaining and identifying other users as "friends" from a user's contact list. A user may select and manage which friends to include in their social network.

A friend network database stores the user's information as well as friends' information throughout the network. The friend network database communicates with application stores or other interfaces where a user may visit to view and purchase applications for mobile devices as well as purchase the mobile devices themselves. Examples of applications include, without limitation, media, games, messaging, social networks, stores, and any other application for use on a mobile device, for example a smartphone or PDA. The friend network database supplies the relevant information of a particular application or mobile device to the application store where it is available to the user via their current mobile device or via a personal computer, tablet, laptop, or other device for accessing an application store from a website, intranet site, mobile network site, or similar interface. The information supplied by the database includes the applications downloaded and the mobile device currently operated by a particular friend, or a friend of a friend. In one example, information about mobile devices and applications used by friends are available on websites, where people may purchase mobile devices. If a user is considering purchasing a particular device, he or she is able to view which friends have the same device as well as the applications that run on that device on the website. In this way, a user may compare mobile devices and applications that are available for particular mobile devices to receive a recommendation so that they may reach an informed decision on which mobile device to purchase. In another example, the application store enables a mobile device to display how many friends have downloaded a particular application or own a particular phone. The application store displayed on the mobile device may also identify how many friends of friends have downloaded an application or own a particular phone. The store may also reveal the identities of the friends and friends of friends. Other features may also be included at the application store including ratings and reviews of particular applications or devices. The application store thus offers a recommendation to a user of mobile devices to purchase based, in part, on the applications that device is compatible with, and recommends applications for their existing mobile device or that will run on a new device if purchased.

Reference now is made in detail to the examples illustrated in the accompanying drawings and discussed below. FIG. 1 illustrates one example in which a user terminal 10 may communicate with an application store 20 and a friend network database 30. The user terminal 10 may comprise a mobile device, personal computer, laptop, tablet, or other suitable device for accessing and displaying information from an application store, mobile device store, or similar interface. The user terminal 10 communicates with the application store 20 and the friend network database 30 to transmit and receive information from the application store 20 and friend network database 30. Likewise, the application store 20 communicates with the friend network database 30 to transmit and receive information from the friend network database 30. Similarly, the friend network database 30 transmits and receives information to and from the user terminal 10 and application store 20. The user terminal 10, application store 20, and the friend network database 30 communicate with each other over a mobile network, the Internet, one or more intranets, or a combination thereof (see e.g., FIG. 5 discussed below). In one example, the user terminal communicates via a mobile network which connects to other networks supporting the application store 20 and the friend network database 30, and the application store 20 and friend network database 30 communicate with each other over one or more Intranets. As shown in FIG. 1, the user terminal 10 may communicate directly with an application store 20 and the friend network database 30, or it may communicate indirectly with the friend network database 30 via the application store 20. The application store 20 may communicate directly to both the user terminal 10 and the friend network database 30. The friend network database 30 may communicate directly with the application store 20, directly with the user terminal 10, or indirectly with the user terminal 10 via the application store 20.

The application store and mobile device store may take the form of a website, intranet site, mobile network site, or other suitable interface for displaying, interacting with, and allowing a user to purchase and/or download applications and/or mobile devices. The application store and mobile device store may be a plurality of sites or interfaces in communication with each other. Each site may run on one server or a group of server accessible via communication network. The application store may also include an application catalogue that manages the application store. The application catalogue stores the product information and various other information and processes that are utilized by the store to offer various applications, mobile devices, accessories, and other products, including downloadable products, to a user. In one example, the mobile device store may be a website or other suitable interface where users shop for mobile devices. The website may be operated by a mobile carrier, which sells mobile devices for operation on the mobile carrier's network. In another example, the user terminals may include software or programming to access the application store and device store and display information received therefrom.

Figure 2:
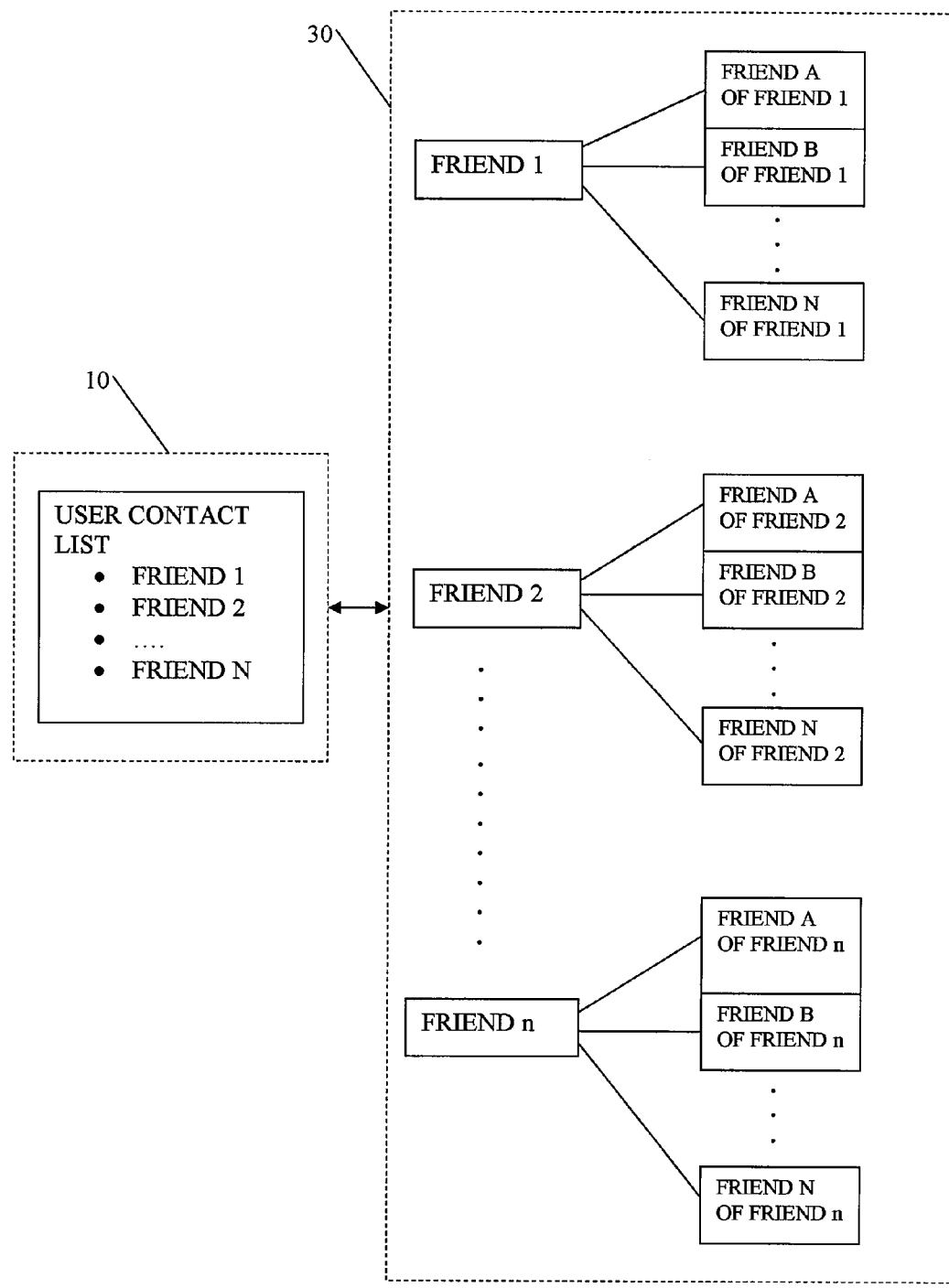
FIG. 2 is a high level block diagram of exemplary content and relationships of a user terminal and friend network database.
Figure 3:
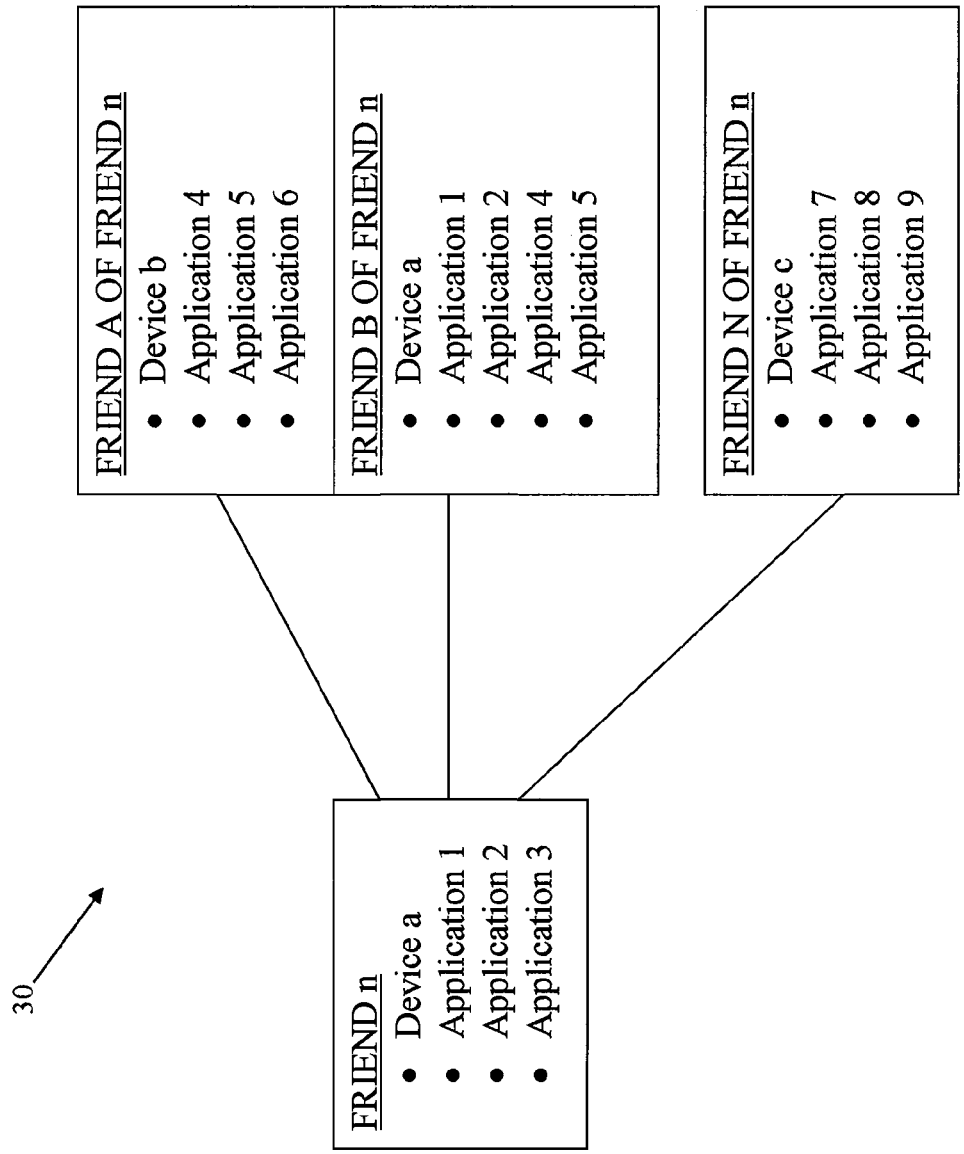
FIG. 3 is a high level block diagram of exemplary content and relationships stored in a friend network database.

The friend network database may be stored and operational from a server or other suitable device or combination of devices suitable for maintaining the database, storing the appropriate information and communicating with user terminals and application stores and other suitable interfaces and devices. The database may be comprised of a plurality of databases communicating with each other. As shown in FIG. 2, an example of a subset of information stored in a friend network database 30 is illustrated, in which relationships between friends and friends of friends are established within the database. Of course, more than two degrees of separation may be established in the database, such as for example, three degrees of separation, i.e., friends of friends of friends. As illustrated in FIG. 3, the database includes information related to the particular device associated with friends and friends of friends and the particular types and amounts of applications associated with friends and friends of friends. The information regarding devices and applications associated with friends and friends of friends is communicated to the friend network database by, for example, the application store or similar interface, or the friend's device once the application is downloaded or the device is purchased and operational. For example, the information regarding the particular device associated with a friend or friend of friend may be communicated from the point-of-purchase, such as a retail outlet or website, from other network devices, such as servers, which receive and store the information for other purposes, or from the device, itself, upon registration with a mobile network. A friend may be represented in the database by their mobile number.

Figure 4:
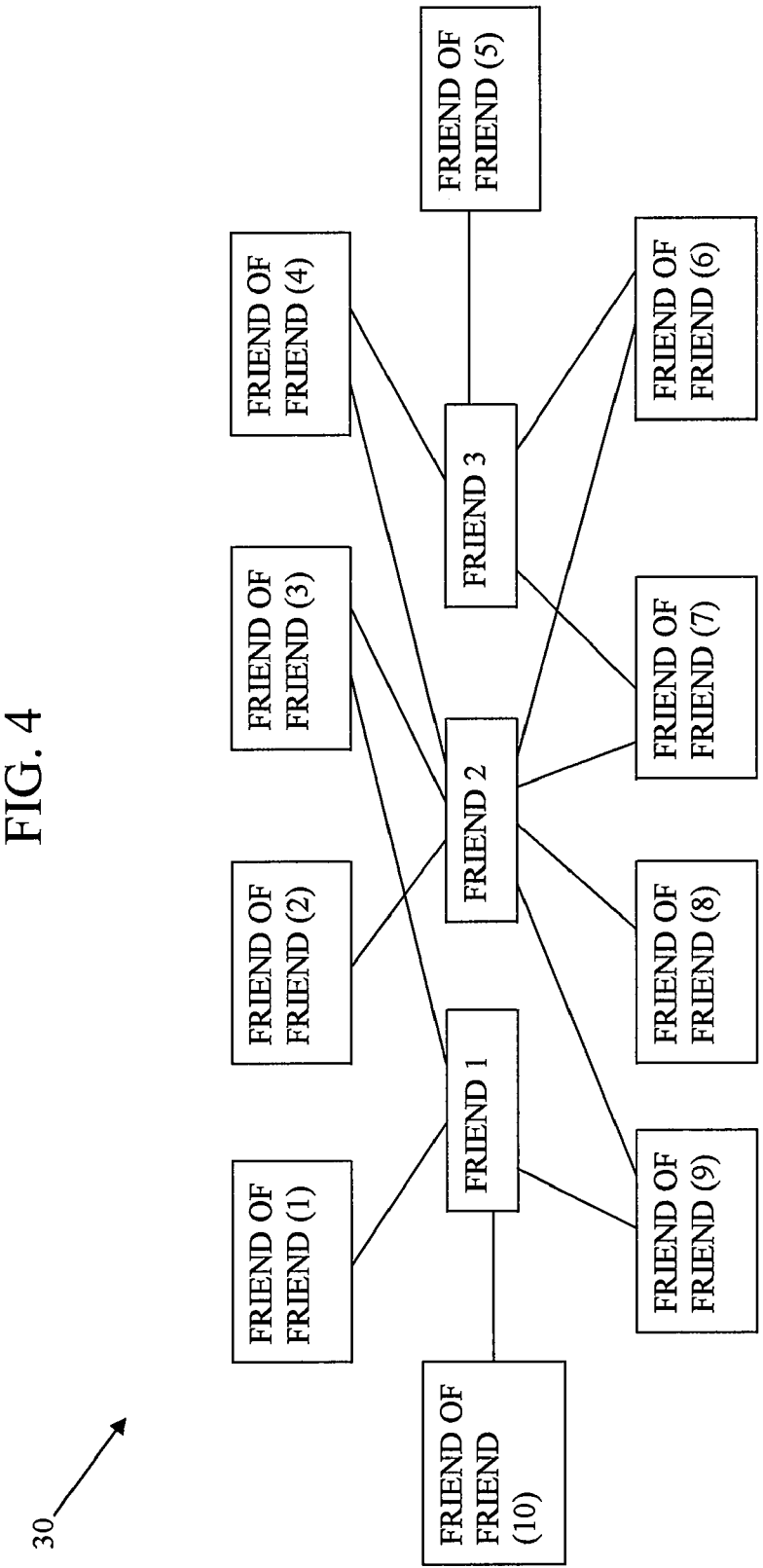
FIG. 4 is another high level block diagram of exemplary content and relationships stored in a friend network database.

The examples shown in FIGS. 2 and 3 illustrate the relationships between particular friends of a user, e.g., FRIEND n and FRIENDS of FRIEND n do not overlap with other friends, e.g., FRIEND 1. However, one of ordinary skill will appreciate that friends of the user will typically have a subset of friends of friends which are the same. This example is shown in FIG. 4, in which relationships for friends of friends are established with different friends in the friend network database 30. In one illustrated example, FRIEND of FRIEND (3) is associated with both FRIEND 1 and FRIEND 2. Similarly, FRIEND of FRIEND (4) is associated with both FRIEND 2 and FRIEND 3. Other examples of friends of friends being associated with more than one friend are also illustrated in FIG. 4. Of course, various permutations and associations between friends and friends of friends of the user can be made within the database and updated, modified, and changed as described below. In addition, a third or higher degree of separation may be created amongst friends of friends of friends. Preferably, two degrees of separation, i.e., friends of friends, are chosen to provide an appropriate amount of data for users when evaluating devices and applications. It will be understood that one of ordinary skill in the art will be able to optimize the degrees of separation in order to provide the most relevant data to the user in an amount which meets the user's needs, depending on how many friends, friends of friends, or friends of friends of friends are associated with the user.

In one exemplary operation of the present disclosure, a social network can be easily established to offer recommendations to a user of a mobile device. The application store or friend network database obtains mobile numbers from a user's contact list by, for example, scanning the user's contact list and retrieving the mobile numbers contained in the contact list (see FIG. 2). The mobile numbers may be obtained in response to a user visiting the application store or manually initiated by the user, or upon connection to a network, such as a mobile network, or other suitable instance. In one example, the mobile numbers are obtained automatically at predetermined intervals, for example, when a user enters the application store or at predetermined intervals of time. The mobile numbers may also be obtained manually via a client application described in more detail below. In the example of the application store obtaining the mobile numbers, the application store communicates the mobile numbers to the friend network database. The friend network database identifies which of the mobile numbers obtained from a user's contact list are currently stored in the database and identifies those numbers as friends of the user. The friend network database may also identify the mobile numbers associated with friends of the identified friends of the user in the database as those of friends of friends of the user.

For each friend and friend of friend, the friend network database obtains and stores information related to the device currently being used by friends and friends of friends and the particular applications downloaded to the devices of friends and friends of friends. This information is associated with the mobile numbers of friends and the friends of friends in the database. The friend network database integrates the information received from the users' contact lists into the database by creating new relationships between the user, the user's friends, and friends of friends of the user.

Once the social network for a user is created with friends and, optionally, friends of friends, the information may be supplied to the application store and any other interfaces which would be capable of displaying the friend information received from the database. The information from the friend network database is useful in offering recommendations to users. For example, a user visiting the application store via a user terminal (mobile device, PC or the like) may be interested in different applications, devices, other downloads or accessories. In response to a user inquiry via their user terminal, the application store communicates information to the user terminal for display on the user terminal regarding friends who have downloaded a particular application or own a particular type of device. In addition, the application store may communicate information related to which devices are capable of running particular applications. In this way, the user is provided with highly relevant information related to a potential application that his/her friends have downloaded and the devices friends currently own. The information may include the amount of friends who have downloaded an application, as well as the amount of friends of friends who have done the same. In addition, the information may include the identity of friends and/or friends of friends who have downloaded an application or own a device. The information may also be helpful for a user interested in a particular device because the user can view which applications have been downloaded or purchased the most and which devices are owned by the friends downloading those particular applications. Likewise, some applications may only be available for certain devices, which may influence a purchase decision of the user contemplating a new device. For example, if a large number of a user's friends have downloaded a certain application and/or have the same mobile device, a user may be influenced to purchase that device. In addition, if certain applications are not capable of being used on a user's current device, and these applications have been downloaded by friends, this may also influence the user to purchase a new device.

In another exemplary operation of the present disclosure, a first time user enters the application store via a user terminal, such as their currently owned mobile device or computer. The application store prompts the user whether they would like to join the social network. Upon affirmation by the user to join the social network, the contact list of the user is obtained from the terminal directly by the friend network database or indirectly via the application store. The contact list is preferably in the form of mobile numbers. The contact list is scanned for mobile numbers. The friend network database utilizes the mobile numbers to identify the mobile numbers of friends and returns a list of friends for display on the terminal. In one example, the friend network database utilizes the phone numbers to identify the mobile numbers of friends who are subscribed with the same mobile carrier and who have also joined the social network and returns a list of those friends for display on the terminal. Optionally, the friend network database may also return a list of friends who have not joined the social network for display on the terminal in order to offer the user an option of inviting those friends to the social network. The user may then review the received lists and select which friends to include in the social network. In another example, friends of the identified friends are also identified by the friend network database as friends of friends of the user and sent to the user for their review and inclusion within the social network.

Once the user selects the friends for the social network, the database transmits friends' information for inclusion in the application store and/or device store (not shown in the drawings). Similarly, information of the friends of the selected friends (i.e., friends of friends) may also be transmitted from the database for inclusion in the application store and/or device store to provide an additional layer of information for the user. In response to inquiries by the user via a user terminal, the application store and/or device store communicates with the user terminal to display a list of applications and/or devices that his/her friends have downloaded and/or purchased. The application store and/or device store may communicate those applications that are available on all friends' devices, on certain friends' devices, on a particular friend's device, applications for only the device the user currently owns, or any combination thereof. In one example, applications that are capable of being downloaded and run on the user's device may have an identifier to alert the user of these applications as well as notify the user that certain applications are not compatible with the user's current device. The application store and/or device store may communicate information to the user terminal regarding the number and/or identities of friends and/or friends of friends who have downloaded and/or purchased an application. The application store and/or device store also communicates to the user terminal the particular devices associated with friends and friends of friends, which allow the user to compare which applications are compatible with their current device to applications compatible with their friends' devices. The application store and/or device store may also communicate other information regarding applications and devices, such as a product description, ratings, comments, and other information related to the application or device. Optionally, the application store and/or device store may communicate an aggregate breakdown of the amount of people within the social network who have downloaded a particular application and/or own a particular device. The information regarding friends and friends of friends may be communicated to the application store and/or device store from the friend network database, and to the user terminal by the application store via suitable channels of remote data communication. In the device store example, in addition to that described above, the device store also allows a user to purchase mobile devices.

A client application for managing a user's social network may also be provided as a standalone application or integrated with the application store, friend network database, the user terminal or a combination thereof. The client application allows the user to manage their social network by, for example, adding, modifying, editing, and deleting friends and friends of friends within the social network. For example, the client application may allow for friends of friends to become friends or vice versa. The client application also allows for users to invite new friends to join the social network who are not currently a part of the user's social network. In one example, the new friends are subscribers of the same mobile carrier as the user. In addition, user, friends, and friends of friends may select which applications the friend network database stores and/or displays on the application store. Users, friends and friend of friends may also remove applications from the friend network database. In another example, the operating system of a user terminal or friend's terminal, may be programmed to track how often an application is used. The information would then be transmitted and stored on the friend network database, which could make that information available to users browsing the application store to not only see how often particular applications were downloaded by friends, but also used by friends after download.

The client application, application store, device store, friend network database, or combination thereof, may provide users the option of opting into the social network or opting out of the social network. In the opt-in example, a user, friends and friends of friends actively affirm or confirm whether to share the information in the social network related to the downloading of applications or other programs because the default is that no information will be shared or communicated to or by the friend network database. For example, a friend confirms whether they want to share information related to a recently downloaded application, and the absence of any confirmation results in the information not being communicated to the friend network database or not allowing the friend network database to communicate that information to the application store. In the opt-out model, the default is that all information related to the applications, devices, accessories, of a user, friend, or friend of friend will be communicated and stored on the friend network database and communicated to the application store. The user, friend or friend of friend must choose to prevent the application, device or other relevant information from being communicated to the friend network database or by the friend network database for display on the application store. In another example, certain applications may be designated opt-in or opt-out depending on the content and subject matter of the application. In this example, opting-in versus opting-out is application specific depending on preferences and the subject matter of the application.

To appreciate the application of the above-discussed social networking methods and devices, it may be helpful to consider the context of an exemplary system of networks as well as the hardware and software of an exemplary mobile station device, as may be involved in implementing the above described methods and systems. The mobile station will be discussed later with regard to FIG. 6.

Figure 5:
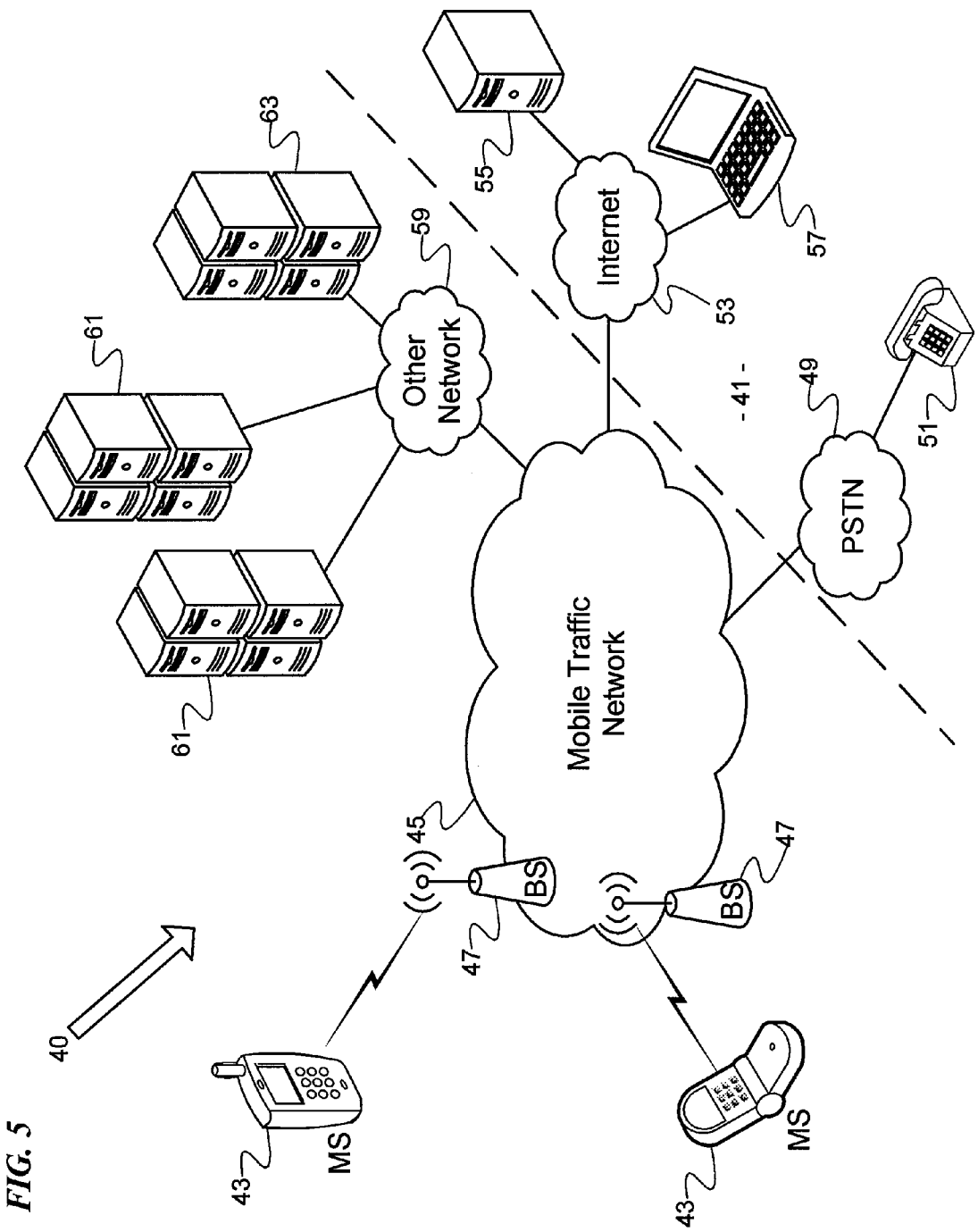
FIG. 5 is a high level functional block diagram, useful in explaining mobile stations, network elements and other components that may be involved in the social network for recommending mobile devices and applications in the mobile station communications and related network and mobile station examples.

FIG. 5 is a functional block diagram of an exemplary system of a wireless network for providing mobile voice telephone services and various data services. For discussion purposes, the diagram shows a wireless network 10. The network 10 may be operated by wireless service providers, carriers or operators. The communication network 10 implementing the illustrated system provides mobile voice telephone communications as well as other services such as text messaging and various multimedia packet data services, for numerous mobile stations. For purposes of later discussion two mobile stations 43 appear in the drawing. The elements indicated by the reference numeral 10 generally are elements of a respective operator's network, although the mobile stations 43 typically are sold to the carrier's customers. Today, mobile stations typically take the form of portable handsets, smart-phones or personal digital assistants, data cards for computers, although they may be implemented in other form factors. The mobile communication network 10 provides communications between mobile stations 43 as well as communications for the mobile stations with other networks and stations shown generally at 41 outside the mobile communication networks. An inter-carrier or other intermediate network 59 may provide communication connectivity between the mobile communication network 10 and servers 61, 63.

The network 10 allows users of the mobile stations operating through the respective network to initiate and receive telephone calls to each other as well as through the public switched telephone network (PSTN) 49 and telephone stations 51 connected thereto. The network typically offers a variety of text and other data services, including services via the Internet 53, such as downloads, web browsing, e-mail, etc. via servers shown generally at 55 as well as message communications with terminal devices represented generally by the personal computer 57.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 43 will typically include one or more RANs and a regional circuit and/or packet switched network and associated signaling network facilities.

Physical elements of a RAN operated by one of the mobile service providers or carriers, include a number of base stations represented in the example by the base stations (BSs) 47. Although not separately shown, such a base station 47 typically comprises a base transceiver system (BTS) which communicates via an antennae system at the site of base station and over the airlink with one or more of the mobile stations 43, when the mobile stations are within range. The BTS is the part of the radio network that sends and receives RF signals to/from the mobile stations that the base station currently serves. For example, each base station 47 will broadcast certain standardized information to allow a mobile station 43 in the region to search for, find and lock-onto the base station 47 and acquire information needed to register and initiate communications via the network 10.

The radio access networks also include a traffic network represented generally by the cloud at 45, which carries the user communications for the mobile stations 43 between the base stations 47 and other elements with or through which the mobile stations communicate. Individual elements such as switches and/or routers forming the traffic network 45 are omitted here for simplicity. Although not separately shown, the network 45 will include or connect with a number of service control elements, for authenticating mobile stations to use the network 10, for authenticating mobile device users and/or for authorizing users or devices to access various services and service features offered by the particular network 10, and for usage accounting and billing functions.

The traffic network portion 45 of the mobile communication network 10 connects to a public switched telephone network 49. This allows the network 10 to provide voice grade call connections between mobile stations and regular telephones connected to the PSTN 49. The drawing shows one such telephone at 51. The traffic network portion 45 of the mobile communication network 10 also connects to a public packet switched data communication network, such as the network commonly referred to as the "Internet" shown at 53. Packet switched communications via the traffic network 45 and the Internet 53 may support a variety of user services through the network 10, such as mobile station communications of text and multimedia messages, e-mail, web surfing or browsing, programming and media downloading, etc. For example, the mobile stations may be able to receive messages from and send messages to user terminal devices, such as personal computers, either directly (peer-to-peer) or via various servers 55. The drawing shows one user terminal device as a personal computer (PC) at 57, by way of example.

The carrier or service provider that operates the network 10 will also operate a number of systems that provide ancillary functions in support of the communications services provided through the network 10, and those elements communicate with other nodes/elements of the network 10 via one or more private IP type packet data networks or Intranets (not separately shown). Such systems maintain various records used for authentication and authorization functions and provisioning necessary information into the mobile stations to enable their operation via the network 10.

For purposes of the present discussion of methods and equipment for offering recommendations to a user via a social network, in one example, the application store and the friend network database may communicate with each other and with the user terminal, such as mobile device 43, via a private Intranet 59 supported by the carrier or service provider via network 40. In another example, the application store and/or friend network database may be stored and run from servers 61, 63 and/or 55. The application store and the friend network database may communicate with each other via network 59 and/or the Internet 53. The application store and the friend network database communicate with the mobile devices 43 via the Internet 53 and/or network 59 and the mobile traffic network 45. The application store and friend network database may also communicate with the mobile device directly via the mobile traffic network 45. In this example, servers communicating directly with the mobile traffic network 45 and mobile devices 43 store and run the application store and friend network database. These servers may also communicate with the Internet 53 and other networks 59. These systems may support downloading of any executable programming for the social network including, for example, programming for obtaining users' contact lists, client applications for managing the social network, and applications downloaded from the application store.

In a further example, the application store and/or device store may be hosted on an Internet site. In this example, the application store and/or device store may communicate with the user terminal via the Internet 53 and network 10. The application store and/or device store may communicate with the friend network database via the Internet 53 and a private Intranet, or through a private Intranet. The user terminal communicates with the friend network database via an Intranet supported by the network 10 or via the application store. Of course, various permutations and examples of the communication structure of the user terminal, application store, device store, and friend network database may be evident from the present discussion.

Figure 6:
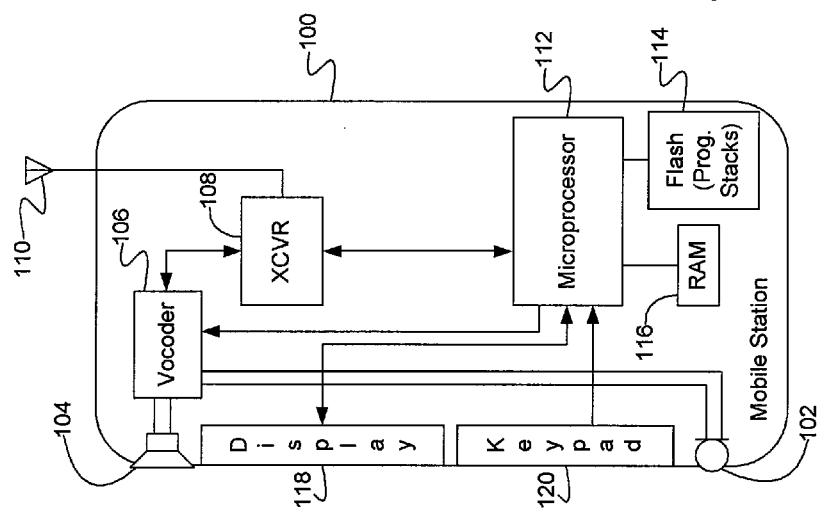
FIG. 6 is a high level functional block diagram of a handset type example of a mobile station.

FIG. 6 provides a block diagram illustration of an exemplary wireless device 100, which may be the wireless device 43 of a user of the network operators. Although the wireless device 100 may be a smart-phone or may be incorporated into another device, such as a portable personal computer, personal digital assistant (PDA) or the like, for discussion purposes, the illustration shows the wireless device 100 in the form of a handset. The handset embodiment of the wireless device 100 functions as a normal digital wireless telephone station. For that function, the station 100 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 100 also includes at least one digital transceiver (XCVR) 108. The transceiver 108 provides two-way wireless communication of information, such as vocoded speech samples and/or digital message information. The transceiver 108 also sends and receives a variety of signaling messages in support of the various voice and data services provided via the station 100 and the communication network (described earlier with regard to FIG. 5). Each transceiver 108 connects through RF send and receive amplifiers (not separately shown) to an antenna 110. In the example, the transceiver 108 is configured for RF communication in accord with a digital wireless protocol. For the social networking method described herein, network communications via the transceiver 108 and antenna 110 will include transmitting a user's contact list to the application store and/or friend network database, creating a social network, visiting and interacting with an application store, and managing the social network using any of the procedures and devices discussed above relative to FIGS. 1-5. The concepts discussed here encompass embodiments of the station 100 utilizing any digital transceivers that conform to current or future developed digital wireless communication standards.

The station 100 includes a display 118 for displaying messages, menus or the like, call related information dialed by the user, calling party numbers, Internet, Intranet or mobile network sites, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. In addition to normal telephone and data communication related input/output, these elements also may be used for display of menus and other information to the user and user input of selections, if needed during interaction with the social network, application store, download of applications, or other related operations discussed herein. Various combinations of the keypad 120, display 118, microphone 102 and speaker 104 may be used as the physical input output elements of the GUI, for multimedia (e.g. audio and/or video) communications. Of course other user interface elements may be used, such as a stylus and touch sensitive display screen, as in a PDA or smart phone.

A microprocessor 112 serves as a programmable controller for the wireless device 100, in that it controls all operations of the wireless device 100 in accord with programming that it executes, for all normal operations, and for operations involved in the social network method for offering recommendations to users described herein. In the example shown in FIG. 6, the wireless device 100 includes non-volatile memory, for example, flash type program memory 114, for storage of various "software" or "firmware" program routines and mobile configuration settings, and users' contact lists. The wireless device 100 may also include a non-volatile random access memory (RAM) 116 for a working data processing memory. The wireless device 100 may also include a removable memory, for example, a UICC smartcard (not shown). Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112. For example, programming may include instructions for accessing and downloading a user's contact list from the mobile device. In addition, it may include the client application for managing the social network and/or instructions for accessing the application store. The programming may also include applications downloaded from the application store.

As shown by the above discussion, functions relating to the social networking to recommend mobile devices and applications may be implemented on computers connected for data communication via the components of a network, operating as the various servers and/or client mobile devices as shown in FIGS. 1 to 5. Although special purpose devices may be used, the server devices also may be implemented using one or more hardware platforms intended to represent a general class of data processing device commonly used to run "server" alone or in combination with "client" programming in the mobile devices, so as to implement the social network functions discussed above.

Figure 7:
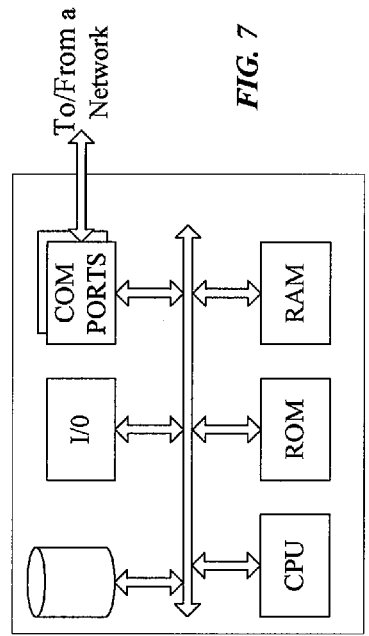
FIG. 7 is a simplified functional block diagram of a computer that may be configured as a host or server.
Figure 8:
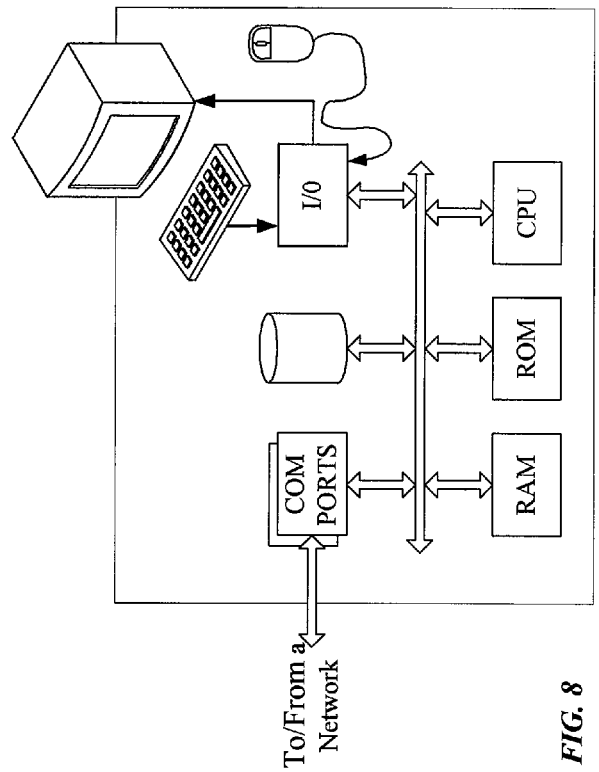
FIG. 8 is a simplified functional block diagram of a personal computer or other work station or terminal device.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that those skilled in the art are familiar with the structure, programming and general operation of such computer equipment and as a result the drawings should be self-explanatory.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the various friend databases and content relating to downloadable applications and/or mobile devices available via the store. The software code is executable by the general-purpose computer that functions as the server and/or that functions as a client device. In operation, the code is stored within the general-purpose computer platform. At other times, however, the software may be stored at other locations and/or transported for loading into the appropriate general-purpose computer system. Execution of such code by a processor or central proceeding unit of the computer platform enables the platform to implement the technique for the social network method for offering recommendation to users for selection and purchase of applications and mobile devices, in essentially the manner performed in the implementations discussed and illustrated herein.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers and client devices are conventional in nature, and it is presumed that those skilled in the art are adequately familiar therewith. Of course, the server functions may be implemented in a distributed fashion on a number of similar platforms, to distribute the processing load.

Hence, aspects of the present social network method outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the social network method, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used in the detailed description above.

BS-Base Station
BTS-Base Transceiver System
CD-ROM-Compact Disc Read Only Memory
CPU-Central Processing Unit
DVD-Digital Video Disc
DVD-ROM-Digital Video Disc Read Only Memory
EEPROM-Electrically Erasable Programmable Read Only Memory
EPROM-Erasable Programmable Read Only Memory
FLASH-EPROM-Flash Erasable Programmable Read Only Memory
GUI-Graphical User Interface
IP-Internet Protocol
IR-Infrared
PC-Personal Computer
PDA-Personal Digital Assistant
PROM-Programmable Read Only Memory
PSTN-Public Switched Telephone Network
RAM-Random Access Memory
RAN-Random Access Network
ROM-Read Only Memory
RF-Radio Frequency
UICC-Universal Integrated Circuit Card
WAN-Wide Area Network
XCVR-Digital Transceiver

What is claimed is:

1. A social network method of offering recommendations to a user of a mobile device, comprising steps of:
obtaining mobile numbers from a contact list associated with the mobile device of the user;
identifying the mobile numbers from the contact list as those of friends of the user, in a friend network database;
identifying a type of mobile device associated with the respective identified mobile numbers, based on friend network data associated with the user in the friend network database;

recording in the database, in association with each of the identified mobile numbers, identification of software applications downloaded to respective mobile devices of the user's friends associated with the respective identified mobile numbers; and based on the friend network data, and responsive to at least one inquiry from the user, transmitting information regarding the user's friends in the friend network database who have a particular type of mobile device and who have downloaded a particular software application through a data communication network to a terminal of the user.

2. The method of claim 1, wherein the information regarding friends includes a total number of the user's friends in the friend network database who have the particular type of mobile device.

3. The method of claim 1, wherein the information regarding friends includes a total number of the user's friends in the friend network database who have downloaded the particular software application.

4. The method of claim 1, wherein the information regarding friends includes identities of the user's friends in the friend network database who have the particular type of mobile device.

5. The method of claim 1, wherein the information regarding friends includes identities of the user's friends in the friend network database who have downloaded the particular software application.

6. The method of claim 1, wherein the step of obtaining occurs automatically at predetermined intervals.

7. The method of claim 1, wherein the step of obtaining occurs manually based on input from the user via the terminal.

8. A social network method of offering recommendations to a user of a mobile device, comprising steps of:

obtaining mobile numbers from a contact list associated with the mobile device of the user;

identifying the mobile numbers from the contact list as those of friends of the user, based on friend network data associated with the user in a friend network database;

for each respective identified mobile number of friends of the user, identifying mobile numbers of friends of the identified friends as those of friends of friends of the user, in the friend network database;

for each respective identified mobile number, identifying a type of mobile device associated with the respective identified mobile number, in the friend network database;

recording in the database, in association with respective identified mobile numbers, identification of software applications downloaded to mobile devices of friends or friends of friends identified by the respective identified mobile numbers; and based on the friend network data, and responsive to at least one inquiry from the user, transmitting information regarding friends and friends of friends having a particular type of mobile device and information regarding friends and friends of friends who have downloaded a particular software application through a data communication network to a terminal of the user.

9. The method of claim 8, wherein the information regarding friends and friends of friends comprises a number of friends and a number of friends of friends having a particular type of mobile device.

10. The method of claim 8, wherein the information regarding friends and friends of friends comprises a number of friends and a number of friends of friends who have downloaded a particular software application.

11. The method of claim 8, wherein the information regarding friends and friends of friends comprises identities of the friends and the friends of friends having a particular type of mobile device.

12. The method of claim 8, wherein the information regarding friends and friends of friends comprises the identities of friends and friends of friends who have downloaded a particular software application.

13. The method of claim 8, wherein the step of obtaining occurs automatically at predetermined intervals.

14. The method of claim 8, wherein the step of obtaining occurs manually.

15. An article of manufacture, comprising programming instructions for causing a processor to perform the method of claim 1 and a non-transitory machine readable storage medium bearing the programming instructions.

16. An article of manufacture, comprising programming instructions for causing a processor to perform the method of claim 8 and a non-transitory machine readable storage medium bearing the programming instructions.

17. The method of claim 1, wherein the transmitted information includes product ratings for the particular type of mobile device and the particular software application.

18. The method of claim 1, further comprising:
enabling the user to purchase the particular type of mobile device or download the particular software application through the data communication network via an interface provided for the user at the terminal.

19. The method of claim 1, further comprising:
based on the friend network data, and responsive to at least one inquiry from the user, presenting, via an interface provided for the user at the terminal, a list of software applications that the user's friends have downloaded and a list of mobile devices that the user's friends have purchased.

20. The method of claim 1, wherein the user's friends in the friend network database can choose to opt out of sharing information related to particular mobile devices purchased or particular software applications downloaded by the respective friends.

* * * * *